United States Patent [19]
Knepler

[11] 3,828,173
[45] Aug. 6, 1974

[54] GRAIN ANALYSIS COMPUTER CIRCUIT
[75] Inventor: John T. Knepler, Auburn, Ill.
[73] Assignee: Dickey-John Corporation, Auburn, Ill.
[22] Filed: Aug. 1, 1972
[21] Appl. No.: 277,056

[52] U.S. Cl............... 235/151.35, 356/81, 356/188, 356/201, 250/339, 250/341
[51] Int. Cl. .......................... G06g 7/24, G06g 7/48
[58] Field of Search..................... 235/151.3, 151.35; 250/215, 217 R, 220 R, 223 R, 338–341; 356/51, 81, 188, 201

[56] References Cited
UNITED STATES PATENTS

| | | | |
|---|---|---|---|
| 3,428,796 | 2/1969 | Martens et al............. | 235/151.35 X |
| 3,515,489 | 6/1970 | Chisholm............................ | 356/201 |
| 3,531,202 | 9/1970 | Wilkinson et al..................... | 356/81 |
| 3,553,444 | 1/1971 | Tong............................... | 235/151.35 |
| 3,676,007 | 7/1972 | Kiess.............................. | 356/188 X |
| 3,701,601 | 10/1972 | Plumpe, Jr. et al........ | 235/151.35 X |
| 3,706,877 | 12/1972 | Clifford, Jr. et al........... | 235/151.35 |

Primary Examiner—Malcolm A. Morrison
Assistant Examiner—Jerry Smith
Attorney, Agent, or Firm—Olson, Trexler, Wolters, Bushnell & Fosse, Ltd.

[57] ABSTRACT

A grain analysis computer has a quartz-iodide lamp to provide infrared radiation which is directed through a lens and toward the surface of a quantity of ground grain which is to be analyzed. The infrared radiation passes through selected filters so that only a specific frequency of radiation impinges upon the grain sample, this specific frequency thus providing a reflected radiation signal which corresponds to a specific constituent of the grain sample being analyzed. A plurality of pulse signals is generated by a photocell, each pulse signal corresponding to the output of a given filter element and having an amplitude corresponding to the quantity of the constituent being measured. These pulses are applied to a signal storage circuit and a signal computing circuit to provide a direct readout in terms of per cent of the constituent being analyzed. A reference standard element is automatically positioned in light-receiving relation with the light source through the filters so that before each test is made the circuit is automatically adjusted.

11 Claims, 14 Drawing Figures

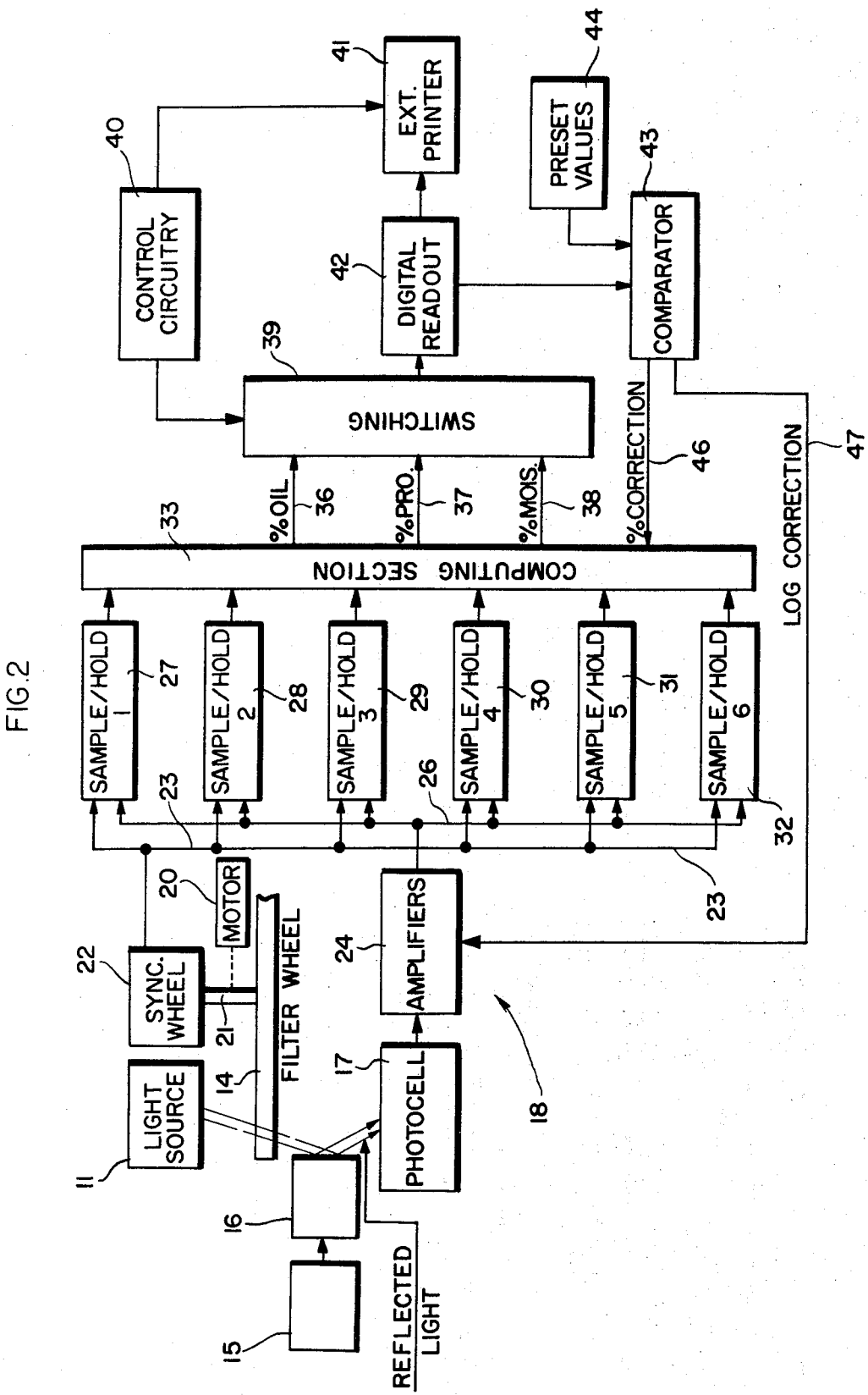

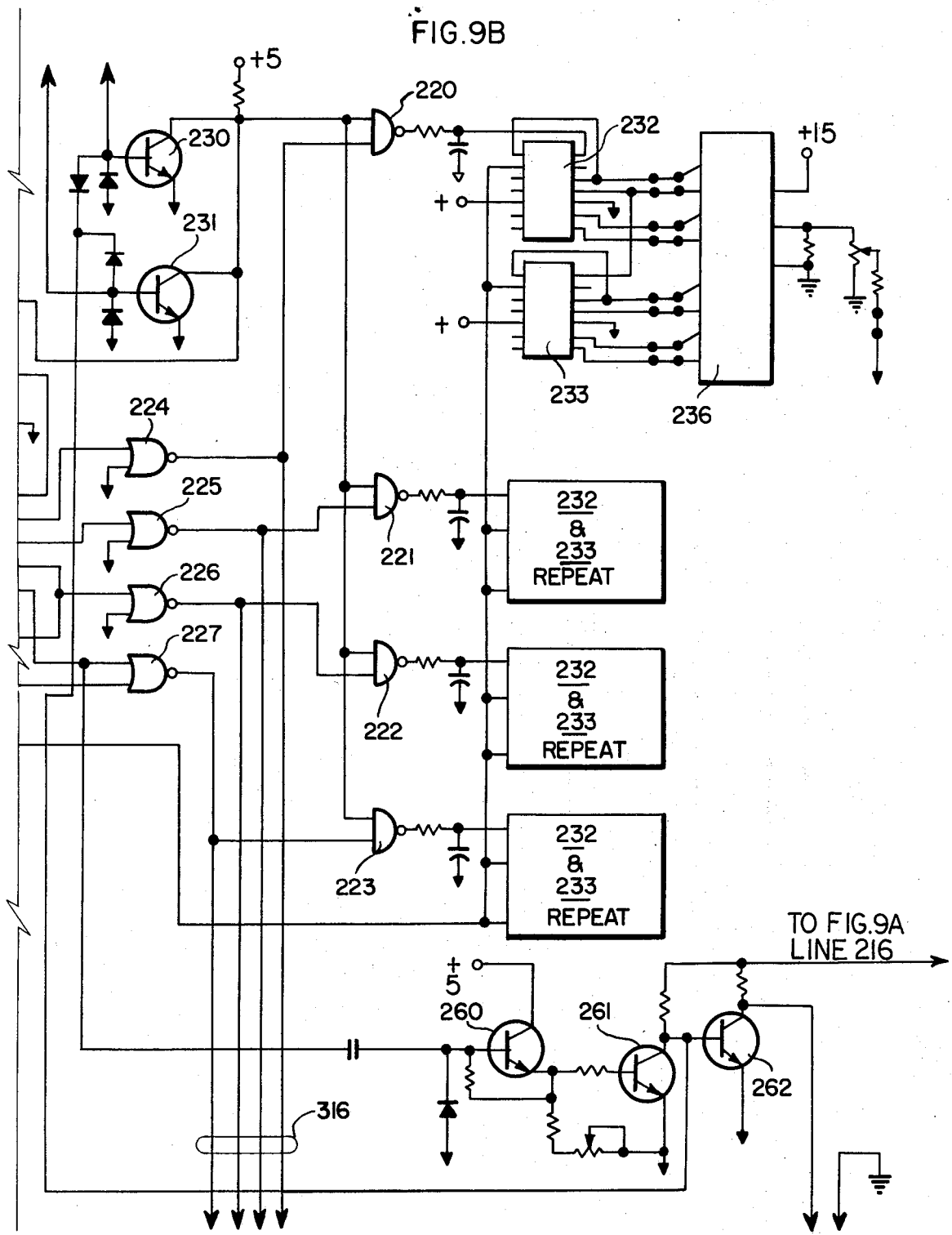

3,828,173

GRAIN ANALYSIS COMPUTER CIRCUIT

BACKGROUND OF THE INVENTION

This invention relates generally to grain analyst computer circuit arrangements, and more specifically to a grain analyst computer circuit for use in computing specific constituents of soybeans or the like.

The use of soybeans to manufacture a wide variety of diversified articles is well-known. Soybeans can be used to produce protein concentrated food products as well as plastics of all types. Also, the oil in soybeans is used for a multitude of different reasons. Because of the wide variety of substances which can be made from soybeans it is desired to know the relative per cent of certain constituents within the soybean to be processed for each of the different products made therefrom. For example, when utilizing the soybean to manufacture protein food supplements it is desired to obtain soybeans having a known per cent of protein constituents therein so that the buyer can determine the quality and price of the soybeans. On the other hand, when oils are to be extracted from the soybean it is desired to know the relative per cent of oil within the soybean for the same reason. In either instance it is always desired to know the relative amount of moisture within the soybean because this moisture is not used in the refining process of the soybean but only adds to the weight of the unprocessed soybean.

SUMMARY OF THE INVENTION

Accordingly, it is an object of this invention to provide a new and improved grain analyst computer which will provide a simple method of determining the amount of oil, protein and moisture in per cent by weight within grains such as soybeans or the like.

Another object of this invention is to provide a grain analyst computer which is efficient and reliable in operation and which is relatively inexpensive to manufacture as compared to other known grain analyzing equipment.

As mentioned above, soybeans are processed into many different end products and the processors of the end products have a vital interest in knowing the per cent by weight of such things as the moisture, protein and oil content within the soybeans being used. All soybeans are not alike. Some have more or less protein, some have more or less oil, and some have more or less moisture. This is of interest because the yield that will be obtained during the process depends on the amount of the constituent of interest. The grain analyst computer of this invention is designed to provide a direct readout of oil, protein and moisture in per cent by weight in less than five minutes. This would make it feasible to test beans while the truck or rail car waits for unloading so that the soybeans can be categorized and placed in the proper storage elevator. This in turn permits the elevator operator to buy, bin and sell beans on the basis of the amount of oil, protein and moisture within the soybean so that similar soybeans can be put in the same bin and their true market value more accurately determined.

Farmers may also have grain tested in advance of delivery to the grain elevator and thus sell grain at the market by telephone to those buyers who want grain with a particular per cent content of oil, protein and moisture. This is particularly true with soybeans. Being able to measure the oil and protein content of soybeans offers a real opportunity to bin and ship beans to satisfy particular processors' needs. If high protein is demanded by a customer, ready selection for this ingredient can be made with assurance that the buyer and seller are in complete agreement on the per cent of protein within a given shipment. This is necessary because protein content varies from field to field as well as between varieties of such beans. The buyer who is looking for soybeans having a high per cent of protein is willing to pay a premium for such beans. The same thing applies to buyers who want a high per cent of oil in soybeans. Users desiring a high oil content will pay a premium for such soybeans because there is less waste in unit weight of the processed bean. The grain analysis computer provides a readout of the moisture content as a percentage of gross weight and then gives the percentage of protein and oil of the residual dry weight that is left. Therefore, pricing can be done on the basis of weight, less moisture content. A simple and fast means of measuring these important constituents in soybeans will give both the buyer and seller a new means to determine the value of the product during trade and allow for payment on the basis of actual value.

To better satisfy the buyer's needs and hence provide a basis for more efficient and effective marketing, large quantities of soybeans of similar constituent analysis, regardless of the field or farmer providing the same, can be placed in large common bins and shipped together without worry of intermixing of soybeans of lesser or different quality.

Briefly, the grain analyst computer of this invention is provided with a quartz-iodide lamp which is an infrared radiant source of energy. The infrared radiation is directed toward the surface of a small quantity of grain to be analyzed, this grain sample preferably being in a relatively fine ground state. The infrared radiation passes through a collimating lens to make the light rays thereof parallel. The parallel rays of the infrared radiation are directed through an aperture which prevents outside light from intermixing therewith. This well isolated and parallel quantity of infrared radiation passes through a selected one of a plurality of filter elements prior to impinging upon the surface of the grain sample. The reflected infrared rays, of a relatively narrow frequency as selected by the filter, are directed to a photocell or other sensor to produce an output pulse having an amplitude corresponding to the quantity of the constituent then being measured. The electrical pulse signal is then delivered to a storage circuit and therefrom to a computing circuit whereupon the signal information is transformed into a readout.

BRIEF DESCRIPTION OF THE DRAWINGS

FIG. 2 is a block diagram of the electrical components of the grain analyst computer of this invention;

FIGS. 9A and 9B further illustrate circuitry for controlling the automatic calibration operation of the computer circuit of this invention.

DETAILED DESCRIPTION OF THE ILLUSTRATED EMBODIMENT

Figure 1:
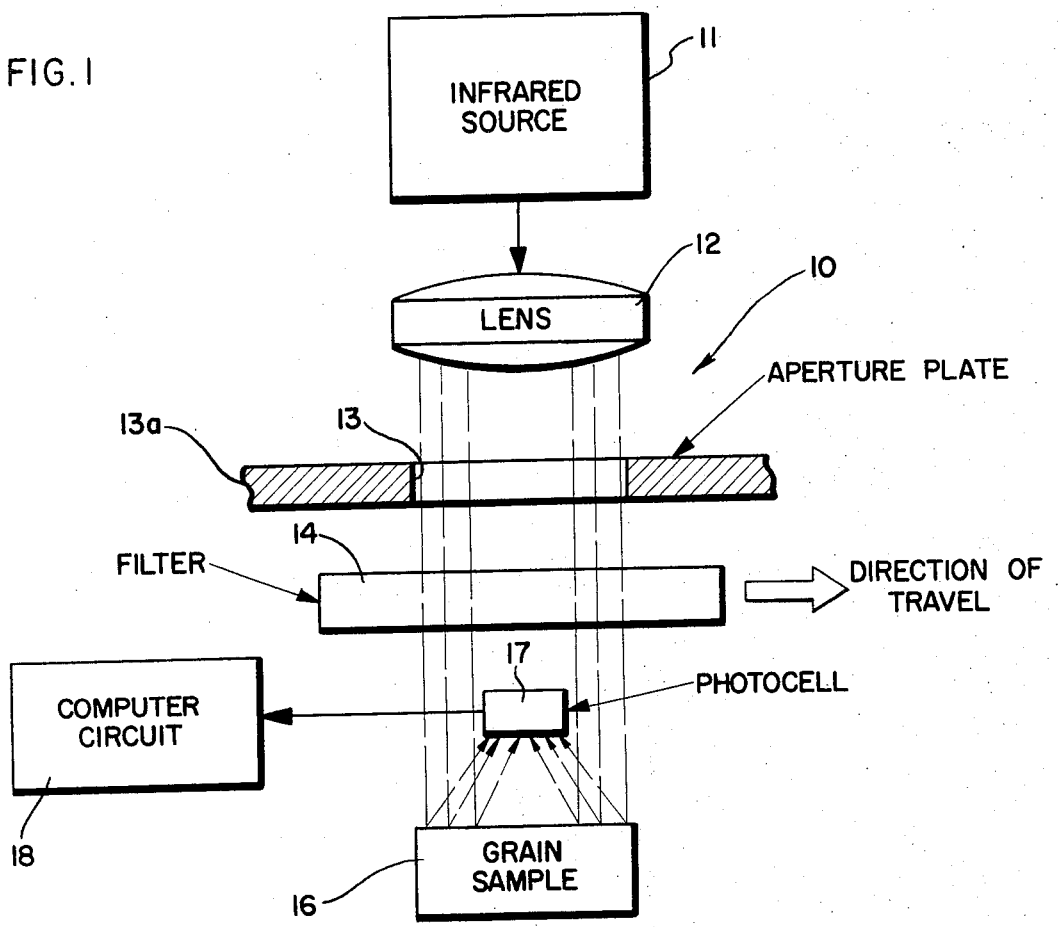
FIG. 1 is a simplified block diagram showing the overall arrangement of a grain analyst computer constructed in accordance with the principles of this invention.

Referring now to FIG. 1 there is seen an overall general block diagram of a grain analyst computer system which is designated generally by reference nmeral 10. The grain analyst computer system 10 includes a radiant source of energy 11, preferably being of an infrared source for directing a quantity of noncoherent infrared radiation toward a lens 12. The lens 12 concentrates the infrared radiation into a parallel light beam which is directed throught an aperture 13 formed in a baffle or wall structure 13a which may be part of a housing.

Most advantageously, the parallel light rays passing through the aperture 13 are directed through a selected one of a plurality of discrete filter elements associated with a movable filter structure 14. The filter structure 14 preferably is a rotating wheel with filter elements secured thereto substantially about the periphery thereof so that only one of the filters is in registry with the light source at a specific time. This will cause discrete pulse signal information to be generated corresponding to the filter then in position and the quantity of the constituent being measured. The filtered infrared radiation is a coherent frequency, corresponding to the filter being used, as it impinges upon the surface of a grain sample 16 positioned immediately beneath the aperture 13.

The frequency of the infrared radiation, as selected by the filter then in position, determines a particular segment of the constituent being measured. A reflected signal from the grain sample is directed to a sensor, preferably an infrared sensitive photocell 17 or the like, which generates an output pulse having an amplitude corresponding to the quantity of the constituents being measured. This output pulse signal is directed over a line to a computer circuit 18 whereupon a direct logarithmic reading of the signal is obtained. Also, certain output signals of the filters are combined in adding circuits to produce a composite signal corresponding to the per cent, by weight, of the constituents of oil, protein and moisture. It will be understood that other constituents may be measured if desired.

Referring now to the more detailed electrical block diagram of FIG. 2 the movable filter 14 preferably takes the form of a rotating filter wheel driven by a motor 20 through a common shaft 21. Connected to the common shaft 21 is a synchronization wheel 22 which produces gating synchronizing pulses applied over a line 23 so that when the appropriate filter is in registry with the sample a specific gate circuit is opened. Therefore, as one filter passes from the sample and another filter passes in registry therewith a different gate pulse will be produced by the synchronizing wheel to open up an electrical gate circuit for storing the pulse signal information in the proper sample and hold circuit.

The reflected signals from the grain sample 16 is delivered to the photocell 17 which, in turn, produces a voltage output pulse applied to the input of an amplifier circuit 24. This amplifier circuit produces a pulse each time a filter is in registry with the grain sample and applies these pulses to a line 26. However, only that gate circuit which is open in response to the synchronizing wheel 22 will receive and store the amplified pulse signal information. These signals are then sequentially transferred into the appropriate one of a plurality of sample and hold circuits 27, 28, 29, 30, 31 and 32. The output signals from the sample and holed circuits 27–32 are applied to separate inputs of a computing section 33 which transforms the six logarithmic inputs into three output signals corresponding to the per cent of the constituents being measured. For example, the output line 36 provides a signal corresponding to the per cent of oil content in grain while an output line 37 provides a per cent output corresponding to the protein content in the grain and the line 38 provides a per cent output corresponding to the misture content in the grain. These outputs are applied to a switching circuit 39 which is controlled by a control circuit 40 so that sequential outputs of the respective different percentages of constituents are applied to a digital readout circuit 42. The control circuit 40 also controls the operation of an external printer which may be a strip chart recorder or the like.

A comparator circuit 43 provides a compensation signal which is preset therein by means of a preset value circuit 44 which sets the constant for the circuit. This preset compensation signal may also correspond to the per cent of correction needed for each reading and is delivered to the computing section 33 over a line 46. The comparator 43 delivers the correction signal for the logarithmic signals applied to the amplifier 24 over a line 47.

In operation, the light is reflected from the grain sample and detected by the photocell 17 to produce an output signal having an amplitude, or other electrical characteristic, corresponding to the amount of the constituent being measured. The resulting electric signal is then amplified to a usable level by means of the amplifier circuit 24. The signals of each of the six wavelengths provided by the six filters are sequentially applied to the sample and hold input circuits 27–32 by means of the synchronizing gate pulses produced by the wheel 22. The different voltage levels produced by the different filter elements are stored as DC voltages. These voltages are processed in the computing section and the result is applied to a digital volt meter or the like which displays the constituent percentages. The control circuitry 40 energizes the external digital printer 41 so that a permanent record can be obtained of the constituents being measured. The comparator and preset value circuits are activated by means of a grain sample receiving drawer when the drawer is in a pulled out condition to receive a grain sample. In the pulled out position a reference standard, such as teflon or the like, is positioned in registry with the light source 11 so that the photocell 17 will produce a signal of given amplitude. This will then allow the amplifier 24 and the computing section 33 to be calibrated. When the drawer is closed to place the grain sample in registry with the light source 11, the automatic calibration has already been accomplished and an accurate readout will be obtained.

Figure 3A:
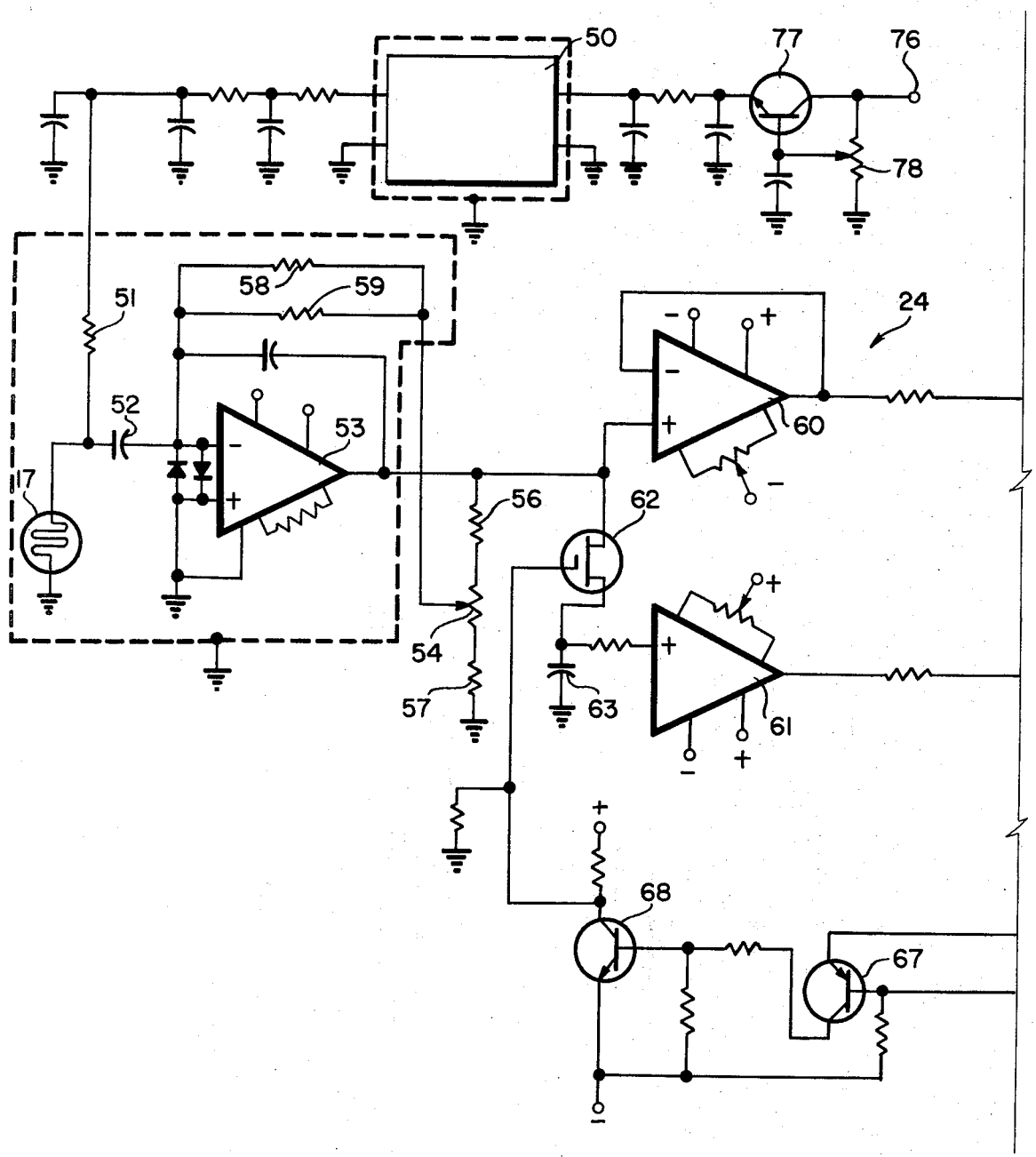
FIGS. 3A and 3B are a detailed schematic diagram of the amplifier circuit as shown in FIG. 2.
Figure 3B:
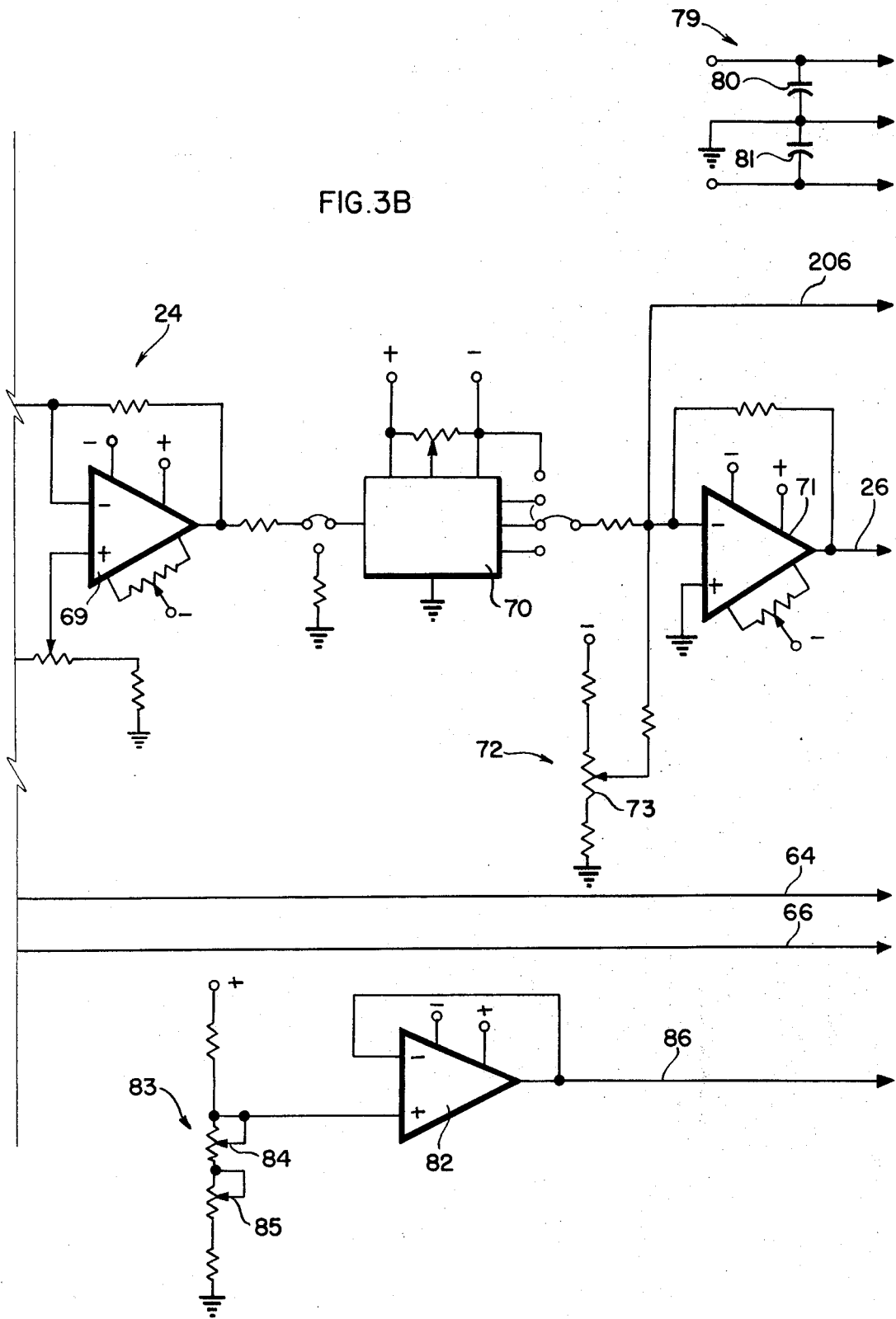

For a better understanding of the amplifier circuit 24 of FIG. 2, reference is now made to FIG. 3 which shows the amplifier circuit in more detail. Here the photocell 17 is connected in circuit with a high voltage solid state power supply 50 which may have a multiplicity of output voltage values. For example, the high voltage power supply 50 provides an 800 volt output at one terminal to be applied through a voltage dropping resistor 51 and therefrom to the series connected photocell 17. The voltage ultimately developed across the photocell 17 is about 80 volts, more or less, and variations in inherent resistance of the photocell corresponding to the reflected infrared signal will produce pulse signal information of a given amplitude which will pass through a coupling capacitor 52. This pulse signal information is then delivered to the inverting input of an operational amplifier 53 which has a pair of parallel oppositely poled diodes connected across its inputs and connected to ground. The gain of this amplifier stage is controlled in response to adjustments of a potentiometer 54 which is connected in series with a pair of fixed resistors 56 and 57. The movable contact arm of the potentiometer 54 is connected back to the input terminal of the operational amplifier 53 by means of a pair of high precision resistors 58 and 59.

Figure 10:
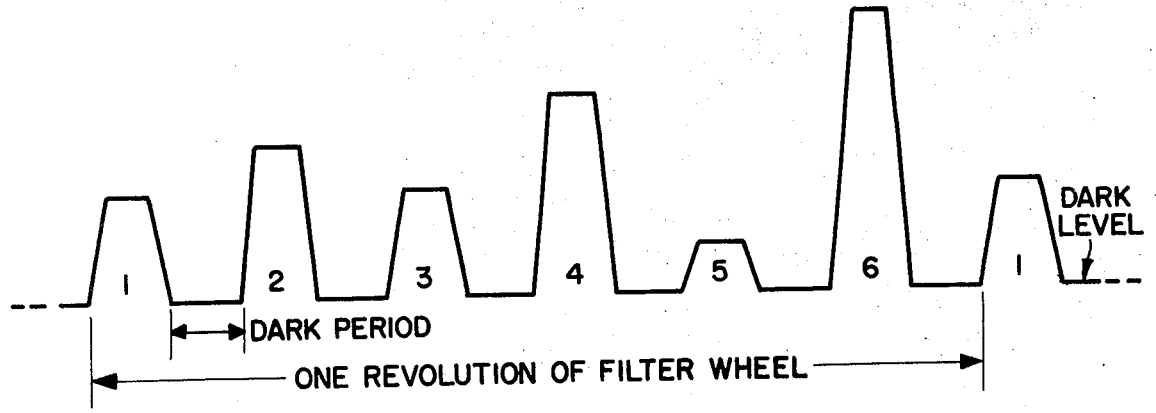
FIG. 10 illustrates a series of wave forms obtained from the light source and photocell used to measure the various constituents within the grain in accordance with this invention.

The output of the operational amplifier 53 is delivered to a pair of operational amplifiers 60 and 61 which may be integrated circuits. The operational amplifier 61 receives the signal through a sample and hold circuit consisting of a field effect transistor 62 and a series connected capacitor 63. The overall circuit gain of the operational amplifier 60 is set at a +1. During the dark periods, i.e. that duration between intervals when a filter is in registry with the light source as shown in FIG. 10, a pulse from the synchronizing wheel is applied to a pair of input terminals 64 and 66 to the emitter base junction of a transistor 67. Preferably, the synchronizing pulse is developed by a light-emitting diode placed in close proximity to a light-dependent transistor. Interposed between the light-emitting diode and the light-dependent transistor are a plurality of slots corresponding in position to the filter position of the filter wheel. The synchronizing pulse at transistor 67 is amplified and delivered to a second transistor 68 to apply a positive 15 volts to the gate electrode of the unijunction transistor 62 which functions as a switching circuit. Therefore, only when a synchronizing pulse is delivered to the emitter electrode of the unijunction transistor 62 will there be a corresponding amplified pulse from operational amplifier 53 delivered to the operational amplifier 61. Also, the output signal from the operational amplifier 53, during the dark period, is then stored in the capacitor 63 and appears as a DC voltage level at the output of the operational amplifier 61.

The output signals from the operational amplifiers 60 and 61 are delivered to still another operational amplifier 69 which functions as a differential amplifier to subtract the output signal level of the operational amplifier 60 from that of the operational amplifier 61. The result is a restoration of the DC level which was lost because of the charge on capacitor 52 at the input of the operational amplifier 53. This will provide a very accurate DC level corresponding to the amplitude of the input pulse produced by the photocell 17. The output signal from the operational amplifier 69 is then coupled to an integrated circuit module 70 which produces an output signal proportional to the logarithm of the input voltage. This logarithm voltage signal is then delivered to an operational amplifier 71 which functions as a buffer amplifier between the logarithm circuit 70 and the output line 26. Connected to the input terminal of the operational amplifier 71 is a voltage divider network 72 which includes a variable resistance element 73 which functions to shift the base level of the pulses received from the integrated circuit 70. At the output terminal of the operational amplifier 71 there then appears a train of six pulses having amplitudes corresponding to the logarithm of the amplitudes of a reflected light signal received by the photocell. The number of such pulses will correspond to the number of filters sequentially moved into registry therewith with the light source. These pulses are then sequentially stored in the sample and hold circuits 27–32, FIG. 2, as mentioned above in response to output signals developed by the rotation of the synchronizing wheel 22.

The high voltage power supply circuit module 50 has connected thereto a low voltage input terminal 76 which delivers current through a series connected regulating transistor 77 to operate the power supply module 50. An adjustment potentiometer 78 is connected between the base collector junction of transistor 77. To provide means for adjusting the voltage level delivered to the power supply circuit 50. A pair of filter capacitors 80 and 81 are used to eliminate extraneous short duration signals such as noise or the like.

Another operational amplifier 82 has one input thereof connected back to the output for degenerative feedback while the plus input terminal thereof is connected to a voltage divider network 83. The voltage divider network 83 includes a first potentiometer 84 which produces a coarse adjustment and a second potentiometer 85 which produces a fine adjustment of a DC level applied to the operational amplifier. Therefore, precise and accurate adjustment of approximately one volt can be obtained at an output line 86 for various other circuit operations such as setting a given bias to a particular circuit.

Referring to FIG. 10 the series of sequential pulse signals correspond in number to the number of filter elements used in the filter wheel 14. The first pulse of a subsequent cycle is shown to illustrate that the filter wheel continues to rotate to produce a train of pulses which has the same pulse reproduced every sixth time when six filters are used. The amplitude of the pulses corresponds to the amount of reflected light from the grain sample, and this amplitude will indicate the amount of the particular constituent present in the sample. Since only three specific constituents are measured, an averaging analysis of the six pulse signals is achieved in the computation circuit. This can be done by, for example, using two pulse signals corresponding to one constituent and another two pulse signals corresponding to a second constituent and still another two pulse signals corresponding to the third and final constituent.

Figure 4A:
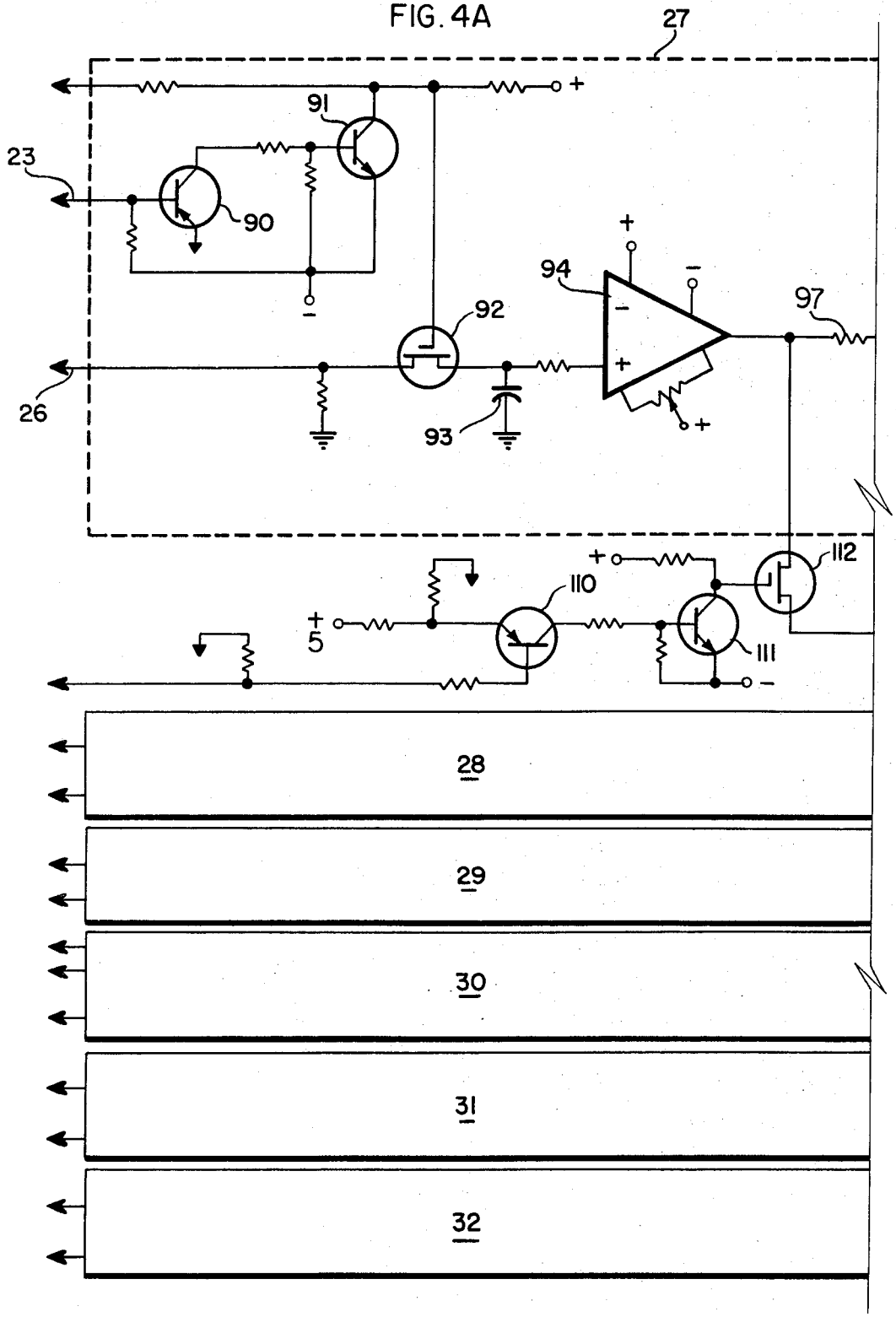
FIGS. 4A and 4B illustrate a plurality of circuit channels to provide log voltage output signals for each of a corresponding plurality of input signals obtained from the filters within the grain analyst computer system, only one channel being shown in detail.
Figure 4B:
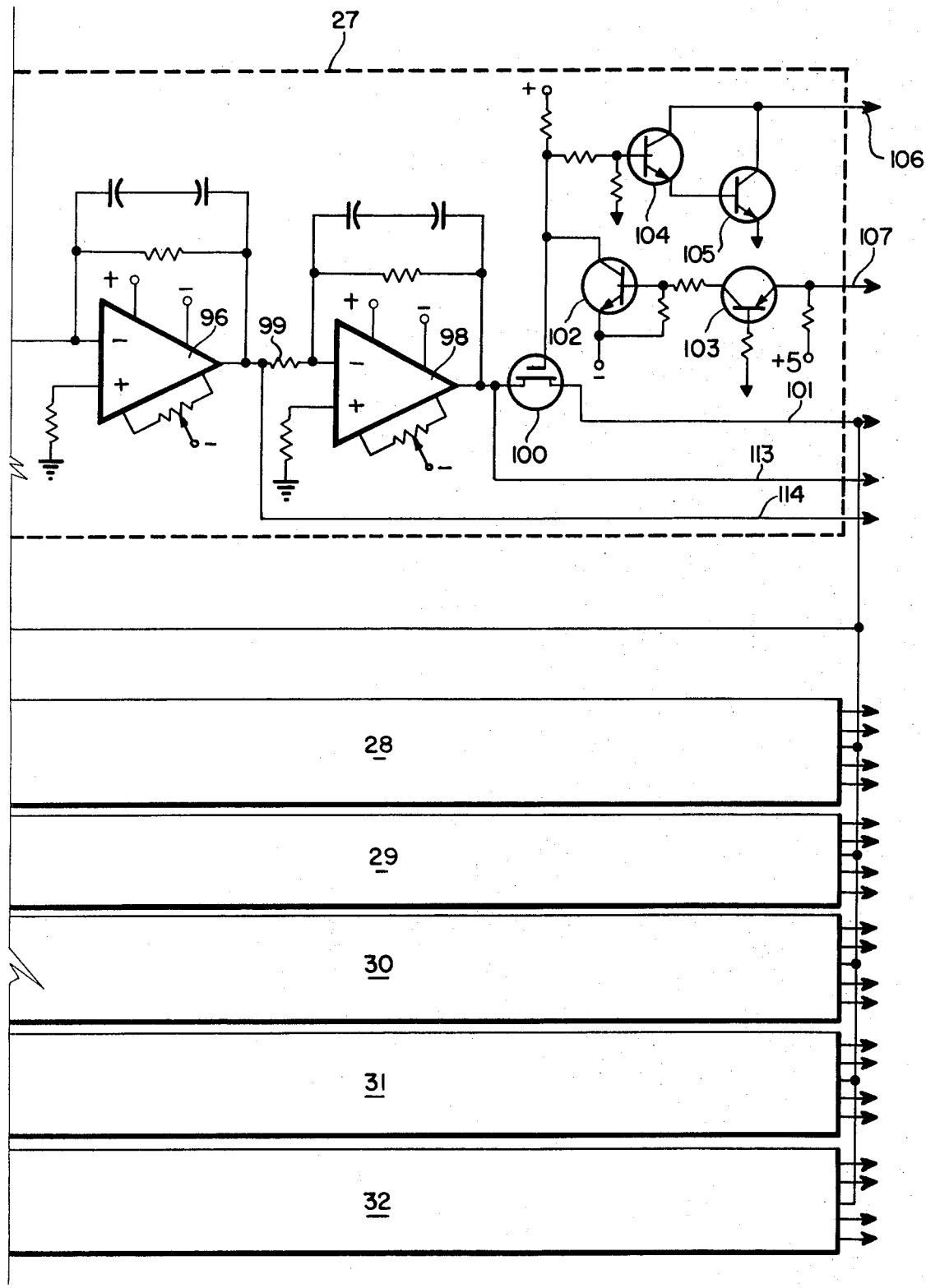

Referring now to FIGS. 4A and 4B there is seen a detailed schematic diagram of one channel of the plurality of sample and hold circuits 27–32, preferably there being six such channels. As all of these channels are substantially identical, only the sample and hold channel 27 is shown in detail. When the first filter of the movable filter member 14 is positioned over the grain sample, a signal is generated by the synchronizing wheel 22, FIG. 2, and this signal is fed to the corresponding channel 27 over the input line 23 to the input of a pair of transistors 90 and 91 which, in turn, control conduction of a field effect transistor 92 which functions as a switching device. The output of the amplifier 24, FIG. 2, is applied to the field effect transistor 92 and gated therethrough when the synchronizing pulse is applied to the emitter electrode thereof. The output signal through the field effect transistor 92 is applied to a charging capacitor 93 at the input terminal of an operational amplifier 94. The operational amplifier 94 functions as a buffer amplifier to prevent discharge of the capacitor 93 between cycles. The voltage output from operational amplifier 94 is a voltage corresponding to the logarithm of the pulse charge on capacitor 93 and is coupled to the operational amplifier 96 through a resistor 97 and therefrom to an operational amplifier 98 through a resistor 99. The gain of operational amplifier 96 is set to be a negative 1 so that the output is the negative log 1, and the output of the operational amplifier 98 is a positive log 1. Thus, if a negative value for one of the constants (K's) is called for, the output from operational amplifier 96 is used. A field effect transistor 100 is connected to the output terminal of operational amplifier 98 and functions as a gate circuit between the operational amplifier and an output terminal 101 which is arranged for connection to a suitable meter readout. Preferably the meter readout is a digital volt meter or the like. A pair of transistors 102 and 103 function as amplifier transistors to operate the switching function of the field effect transistor 100. A pair of transistors 104 and 105 also receive operating signals from transistors 102 and 103 so as to apply a driving potential to a front panel indicator lamp which is connected to the line 106. This front panel indicator lamp will then indicate that the log 1 channel is the channel providing a readout on the meter connected to output line 101. The readout will be sustained for as long as a switch closed condition will exist on the input line 107 connected to a suitable switch at the front panel of the instrument.

A control signal circuit comprises a pair of transistors 110 and 111 for operating a field effect transistor 112 which functions as a switching mechanism between the output of operational amplifier 94 and the meter line 101. This circuit arrangement provides a gating signal to the meter line to measure a log 1 voltage during the automatic recolatration cycle.

The general equation used to provide the computation in percentages of oil, protein and moisture is as follows: $\% = K_1 \log 1 + K_2 \log 2 + K_3 \log 3 + K_4 \log 4 + K_5 \log 5 + K_6 \log 6 + K_7$ where: $K_1 - K_7$ are constants; log 1 − log 6 are the voltages present at the output of the respective sample and hold circuits 27–32, respectively.

Figure 6:
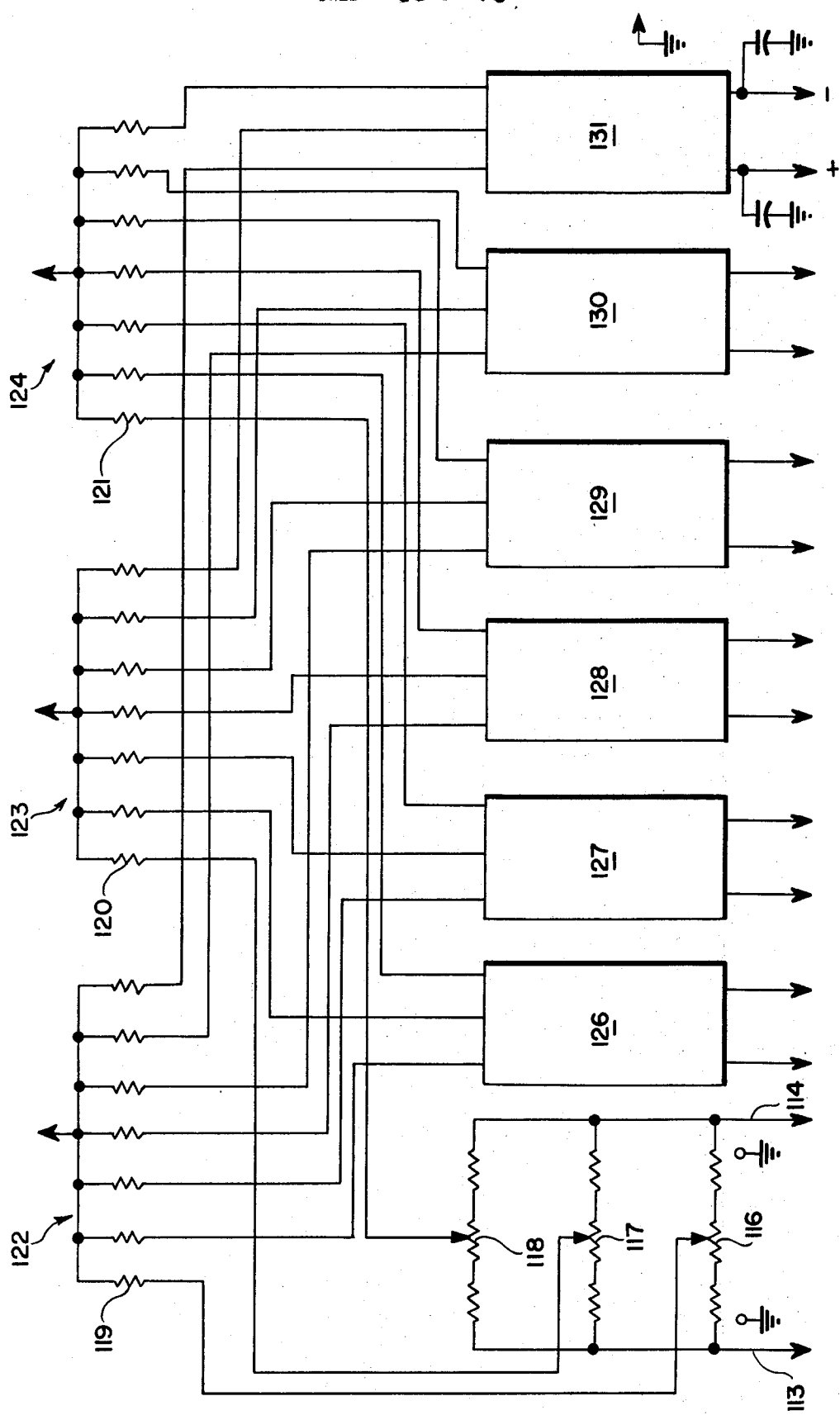
FIG. 6 is a schematic diagram showing the summation circuits and the necessary circuit constants to obtain a computer analog readout in per cent of the desired constituents.

The plus and minus log voltage outputs connected to the output lines 113 and 114, respectively are applied to the corresponding plus and minus log voltage line 113 and 114 of FIG. 6 which is the circuit arrangement which provides for adjusting the relative constants as mentioned above. The circuit of FIG. 6 shows seven constant adjusting circuits. This then provides a compensation for deviation in the supplied voltage.

Referring back to the plus and minus log input lines 113 and 114 of FIG. 6, a voltage signal applied thereto is developed across a plurality of parallel connected adjustable voltage divider circuits 116, 117 and 118. Each of the voltage divider circuits 116–118 includes a potentiometer which has the moveable contract thereof connected to a fixed resistor 119, 120 and 121, respectively, of three associated resistor matrix circuits 122, 123, 124, corresponding to the per cent oil, per cent protein and per cent moisture output respectively. The resistor matrix circuits are summation circuits which produce the appropriate voltage for each of the three constituents to be measured. The output of the other constant selection circuits 126, 127, 128, 129, 130 and 131 have their corresponding variable resistance elements connected to the resistor matrices 122, 123 and 124 through the appropriate series resistance element. The variable resistance elements of each of the voltage divider networks 116–118 are used to set the proper value of the constants within the above equation so that at the movable arm of the resistor the voltage sensed is $K_n \log n$. The fixed resistors within the resistor matrices 122, 123 and 124 are used to sum the individual terms of the equation mentioned above and their junction is connected to a summing amplifier circuit 126a, FIG. 5, of the appropriate summation channel. As the three summation channels for oil, protein and moisture are substantially identical, only the summation channel for oil is shown in detail. The summation amplifier 126a then produces an output signal which is a DC voltage level corresponding to a magnitude equal to the per cent of oil content within the grain sample.

The summation amplifier 126a includes a variable biasing circuit comprising a potentiometer 127a and a variable resistor 128a to adjust the offset voltage of operational amplifier 126a. A feedback network comprises a fixed resistor 129a and a pair of series connected capacitors 130a and 131a parallel with the resistor. The DC current level output of the operational amplifier 126a is delivered through a field effect transistor 132a which functions as a switching device to apply this DC level directly to a meter readout line 133. This direct meter readout line is connected in common with the output of each of the other corresponding channels for protein and moisture. When the per cent of oil switch is closed to apply a signal to a line 134, a pair of transistors 136a and 137a are rendered operative to apply operating potential to the gate electrode of the field effect transistor 132a. This action also applies operating bias potential to a pair of transistors 138a and 139a which will energize the per cent oil lamp connected to an output line 140.

Figure 5:
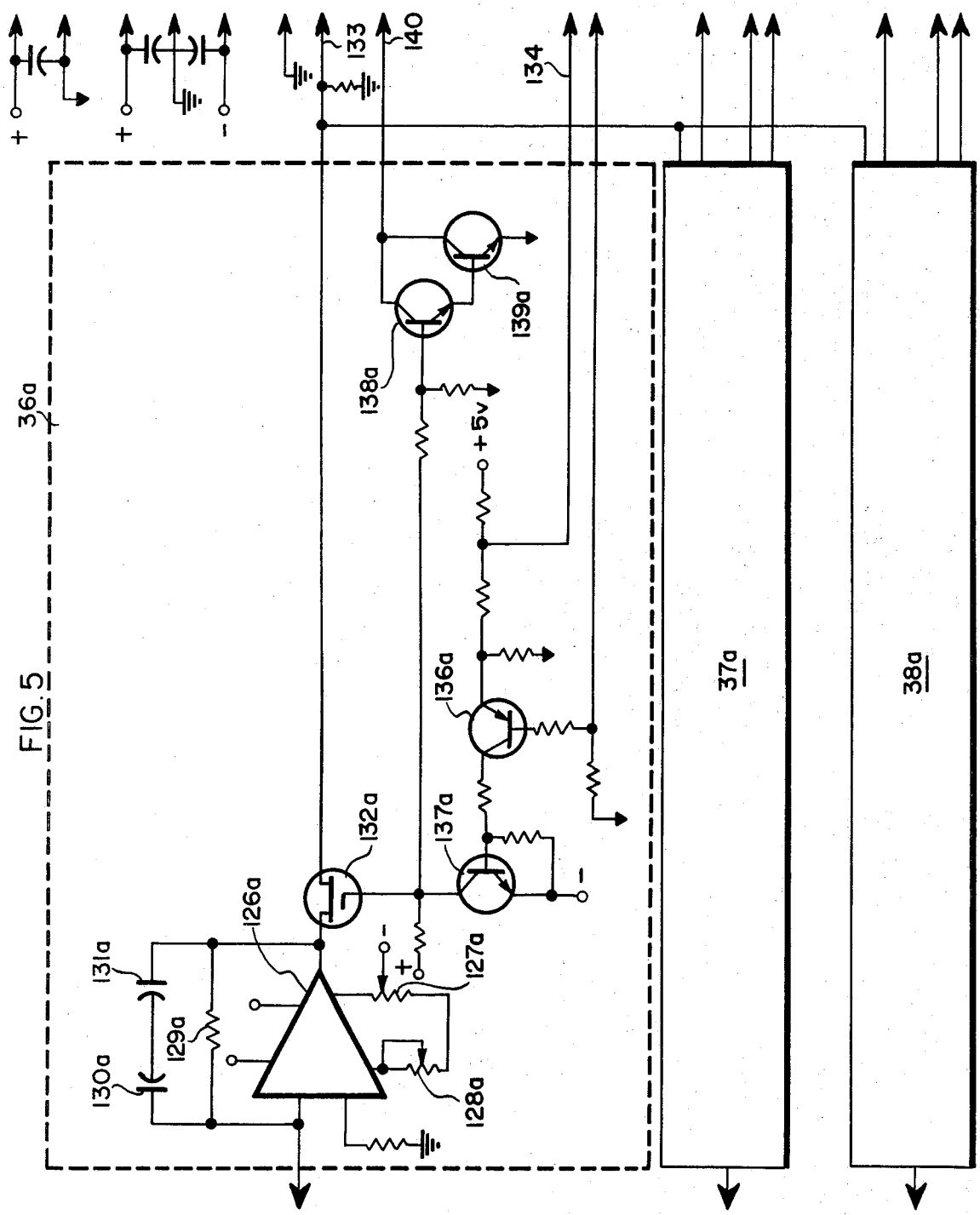
FIG. 5 illustrates the three channels which provide per cent readouts of the constituents of oil, protein and moisture, only the oil channel being shown in detail.

The per cent oil channel 36a, of FIG. 5, as well as the per cent protein and per cent moisture channels 37a and 38a correspond substantially to the output lines 36, 37 and 38 respectively of FIG. 2. It will be understood that the grain analyst computer readings obtained at the meter readout or at the strip recorder can be obtained either manually or automatically. During manual operation switch contacts are connected to the per cent switch lines, such as the switch line 134, to obtain a meter readout from the line 133. When manual selection of the meter readout is obtained, control circuitry for the grain analyst computer is not used.

When automatic readout of the per cent of the constituents measured is desired, an automatic select button, not shown, is actuated to cause automatic readings of the per cents measured to be presented in sequence automatically with the indicator lamp next to each constituent or log reading indicating which constituent or log reading is then being displayed. The control circuitry for this operation is shown in detail in FIGS. 8A, 8B, 9A and 9B.

Figure 8A:
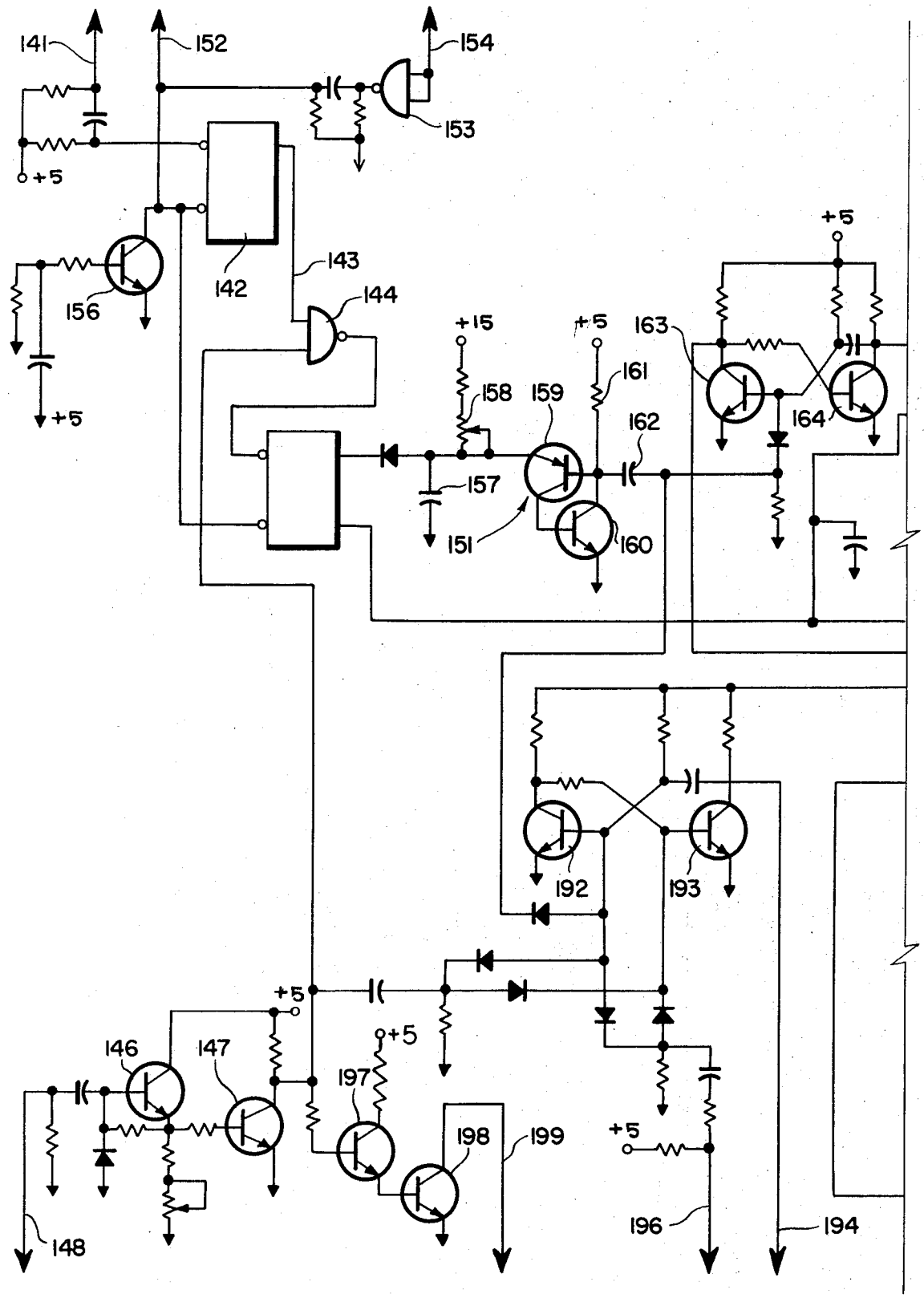
FIGS. 8A and 8B illustrate the detailed schematic arrangement of the control circuitry for sequentially operating the various functions within the respective channels to produce sequential readout of the constituents being analyzed.

When a start switch line 141, FIG. 8A, is activated by closure of a start switch connected thereto and located on the front panel of grain analyzer, a flip-flop circuit 142 will have the Q output thereof generate a logic signal to an input line 143 at a NAND gate 144. Connected to the other input line of the NAND gate 144 is a switch ground circuit comprising a pair of transistors 146 and 147 which will produce a signal when a calibrated lock pulse is applied to an input line 148. When both inputs at the NAND gate 144 are of the same polarity, the state of a second flip-flop circuit 150 will change to enable a timing or clock oscillator circuit designated generally by reference numeral 151.

As mentioned above, during manual operation of the grain analyst computer a manual switch line 152 is activated. Also connected to the manual line 152 is a grounding transistor 156 which, when rendered conductive by initial application of power to the instrument, will clear the flip-flop circuit 150 and disable the oscillator 151.

The oscillator 151 comprises a capacitor 157, a variable resistance network 158 which is used to adjust the frequency of the oscillator, and a pair of transistors 159 and 160. The oscillator circuit 151 operates substantially as a relaxation oscillator to charge and discharge capacitor 157 in accordance with the RC time constant obtained by the resistor network 158. The output of the oscillator 151 is developed across a resistor 161 and applied through a coupling capacitor 162 to a monostable multivibrator circuit comprising a pair of transistors 163 and 164. The monostable multivibrator circuit is of conventional circuit configuration having cross-coupled resistor and capacitor networks to produce a pulse of given pulse width regardless of the pulse width at the input thereof. The output pulse from the monostable multivibrator circuit is then applied to an input line 166 of a decade counter integrated circuit element 167. The output of the counter 167 is a divide-by-ten signal which is applied to the input circuit of a one of ten decoder 168. The output of the decoder 168 is tied to a plurality of lines 169, 170, 171, 172, 173 and 174 which function as the log channel switch pulse applied to, for example, line 107 of FIG. 4. Also, the decoder 168 has output pulses applied to lines 176, 177 and 178 to provide automatic switch pulses for the oil, protein and moisture readouts, such switch lines being represented by line 134 of FIG. 5. Also connected to the per cent oil, protein and moisture switch lines 176, 177 and 178 is a diode blocking network designated generally by reference numeral 180. Therefore, when automatic operation is obtained, the decoder circuit 168 produces switching pulses to provide automatic transfer of the DC voltage developed within the appropriate channel for automatic meter readout thereof.

A triggered pulse for an external printer is obtained through a NAND gate 181 having one input thereof connected to the line 161 from the multivibrator circuit and the other input thereof connected to an output line 182 from the integrated circuit decoder 168. To control printing and labeling apparatus of the external printout means, an integrated circuit counter 183 operates in conjunction with the diode network 180.

A monostable multivibrator circuit comprising a pair of cross-coupled transistors 186 and 187 produces a pulse to control the number of pulses generated by astable multivibrator 189 and 190. An astable multivibrator circuit comprising a pair of transistors 189 and 190 produces a signal along a line 191 to initiate operation of the paper advance for the printer when used. The time interval at which the volt meter produces a reading of the constituent being measured is controlled by a multivibrator circuit comprising a pair of cross-coupled transistors 192 and 193 which produce a signal at the output line 194. The multivibrator circuit comprising transistors 192 and 193 is triggered into operation by a switch trigger pulse along the line 196. This multivibrator circuit will enable the volt meter to make continuous readings until a final value is reached before the stop signal is produced. A pair of direct current coupled transistors 197 and 198 provide an output signal along the line 199 which prevents automatic cycling for a period of, for example, several seconds after the sample is placed in registry with the light source and filter elements.

Figure 8B:
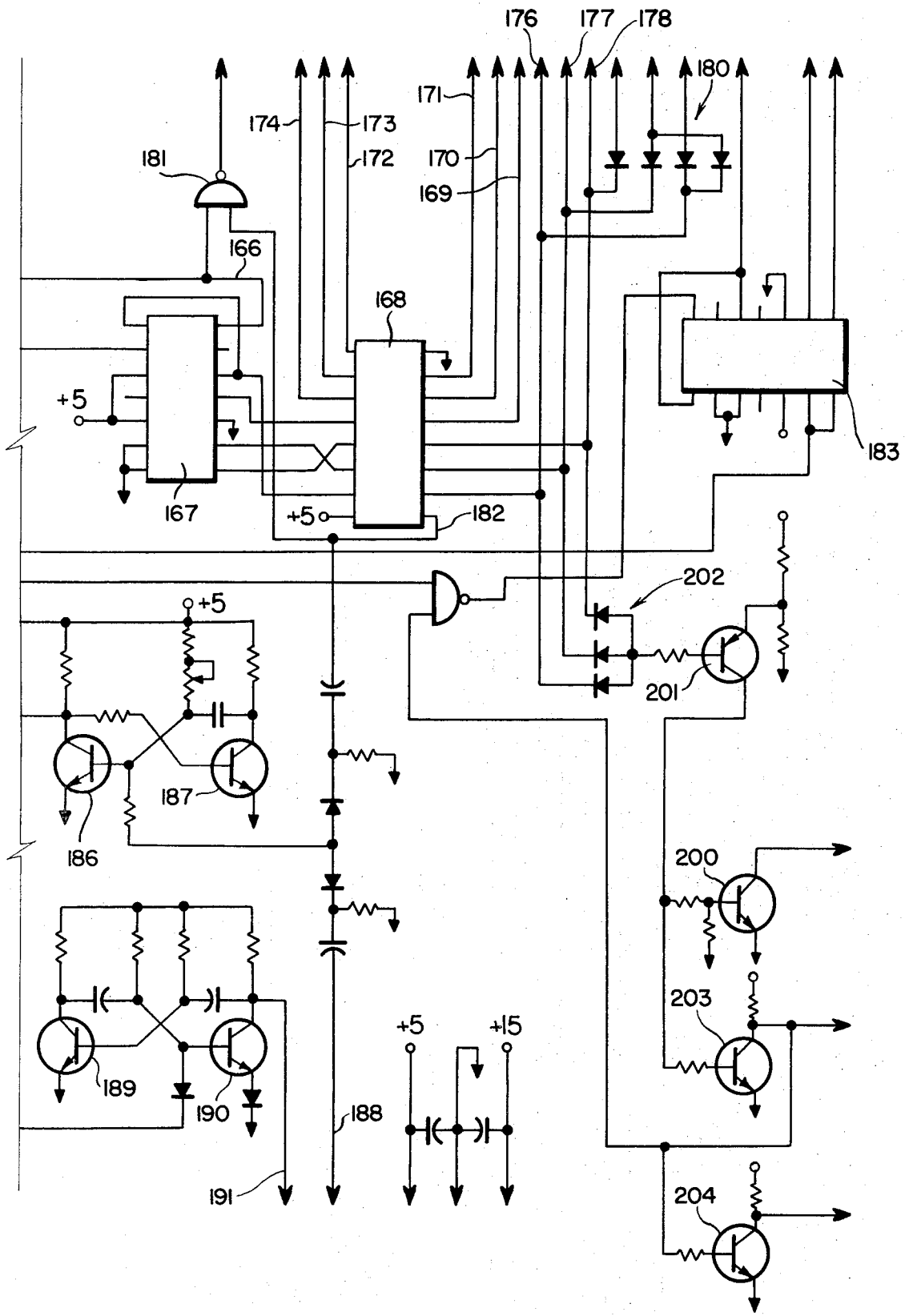

The control circuit of FIG. 8B further includes a meter enable transistor 200 which is rendered operative by a gating circuit comprising a transistor 201 and a plurality of diodes 202 connected to the base electrode thereof. Also placed in operation by gate transistor 201 is a print red enable transistor 203 which, in turn, renders a transistor 204 operative to control the numerical printout device, not shown.

When the constants of the particular grain to be analyzed are determined, the ideal percentage reading for the standard can be calculated using the standards measured log voltage as obtained by a reflected signal through the various filter elements in the system. Once this is accomplished the variable resistance networks 116, 117 and 118, FIG. 6, as well as those of the resistance circuits 126–131 are adjusted to provide the proper log voltage reading. However, there are two sources of error which can cause difficulty in the system if not compensated for during operation. One such source of error is the gradual change in photocell operation as the result of changes in ambient temperature. The effect of this type of change is to shift the log voltage in each of the channels in one direction and therefore a simple main adjustment of applied voltage can be used to correct this change. This is accomplished by the fact that the difference beteween any two long voltages remains constant, and this source of error can be corrected with a compensating current at the input terminal of operational amplifier 71, FIG. 3, by manually or automatically adjusting the current applied thereto. During automatic adjustment, this current is supplied to the input of the operational amplifier by means of a line 206.

Figure 9A:
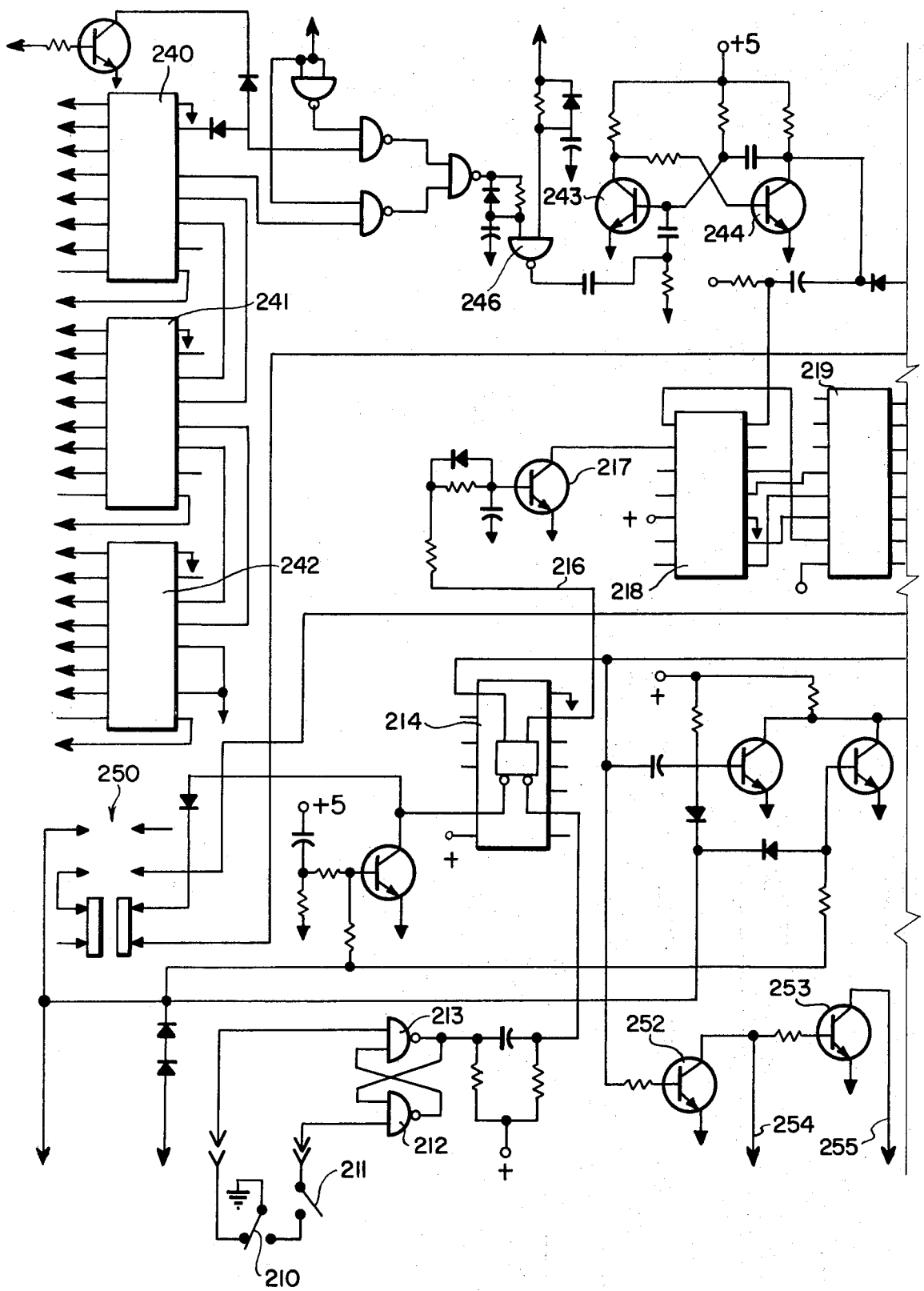

The second cause of error is drift with time and temperature in the summing amplifiers, for example, amplifier 126 of FIG. 5, by adjusting the voltage applied to the input terminal thereof. Generation of this correction signal for automatic operation is accomplished by the circuitry shown in FIGS. 9A and 9B. Preferably, the reference standard in this instance is that of teflon material having inherent constituent properties corresponding to that of soybeans of a preferred type so that calibration can be obtained. When a sample drawer, not shown, is opened, the teflon standard is positioned in registry with the photocell and filter so that automatic adjustment is accomplished prior to closing of the sample drawer. This open drawer condition will cause a switch 210 to connect ground potential in series with a calibration switch 211 which, in turn, is connected to an input of a NAND gate 212. The NAND gate 212 is cross-coupled with a second NAND gate 213 and together therewith function as a switch bounce eliminator circuit. Therefore, when the sample drawer is open and the calibrate switch 211 closed, an integrated circuit flip-flop network 214 changes state to provide an output signal over a line 216 to be amplified by transistor 217 and enable a binary counter circuit 218. A binary coded decimal decoder circuit 219 receives output pulses from the counter 218 and opens sequentially a plurality of NAND gates 220, 221, 222, and 223. Interposed between the binary coded decimal decoder 219 and the NAND gates 220–223 are NOR gates 224, 225, 226 and 227. The gates 220–223 are opened one at a time until the log voltages, per cent oil, per cent protein and per cent moisture constituents are corrected during the automatic calibration operation. For example, when the NAND gate 220 is enabled pulses from the synchronizing wheel 22, FIG. 2, are shaped by a pair of transistors 230 and 231 and used to step a pair of binary counters 232 and 233 sequentially. The output of these counters determines the amount of current output from the digital to analog converter 236 connected thereto to be delivered to the automatic compensating circuit points. The digital to analog converter output current is fed to the operational amplifier then being calibrated, for example, the operational amplifier 126a of FIG. 5. The digital volt meter reading is compared with the ideal value for that particular constituent being calibrated in digital computor circuits 240, 241 and 242. The ideal per centages are set by the diode matrix and transistor amplifier circuit of FIG. 7 for each corresponding channel of constituent being measured. When the measured value of the per cent equals the ideal value, a one shot multivibrator comprising a pair of transistors 243 and 244, FIG. 9A, is triggered in response to an input signal applied thereto through a NAND gate 246. The output signal from transistor 244 is applied to Counter 218 one count at a time so that the constituents can be sequentially recalibrated. When the last constituent has been recalibrated, the output signal from the circuit 219 is fed back through a switch 250 to reset the circuit 214. The circuit 214 has its output connected to a circuit comprising a pair of transistors 252 and 253 which, in turn, are connected to a ready lamp line 254 and a calibrated lamp line 255, respectively. These lamp indicating lines will give visual display that the instrument is calibrated and prepared to take an accurate grain measurement of the predetermined constituents.

A timing circuit comprising transistors 260, 261 and 262 provides a fixed time delay of, for example, several seconds, between the calibration of the log voltages and that of the three separate per cent constituent voltages. This time delay allows the integrating capacitor in some of the operational amplifier circuits to charge fully.

Figure 7:
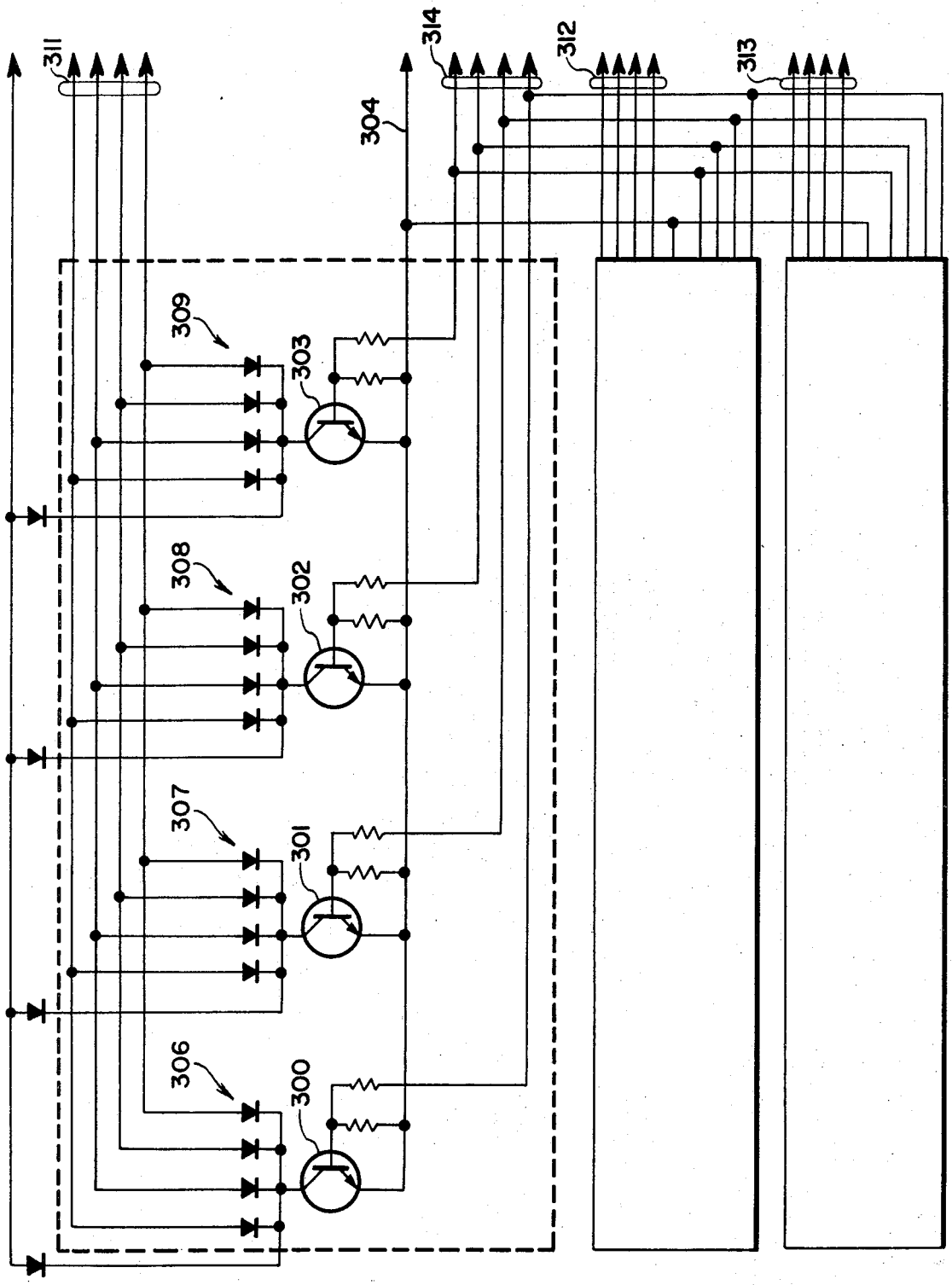
FIG. 7 illustrates the automatic correction circuits for each of the channels for oil, protein and moisture, only one channel being specifically illustrated.

Referring back to the diode and transistor circuits of FIG. 7, only a single channel is illustrated in detail. Here a plurality of transistors 300, 301, 302 and 303 have the emitter electrode thereof connected to a common line 304 and the collector electrodes thereof connected to respective different ones of a plurality of diodes matrices 306, 307, 308 and 309, respectively. The plurality of output lines 311 are connected to the corresponding lines of the comparator circuit 240 while the lines 312 are connected to the corresponding lines of the comparator circuit 241 and lines 313 are connected to the comparator circuit 242. Lines 314 are connected to corresponding lines 316, FIG. 9B.

To adjust all of the constants within the resistance network of FIG. 6 to their desired value, a reference standard element is placed in registry with the light source and the plurality of movable filter elements so that a known signal level can be obtained. For example, in FIG. 2 the reference standard element 15 is moved into position to replace the grain sample 16 so that the reflected light from the filters wil produce a known signal output from the photocell 17. With the reference standard in this position the filter elements are sequentially moved into registry therewith and the synchronization wheel 22 produces gating pulses so that the comparator 43 will generate the necessary per cent correction and log correction signals for the circuit. Thus each of the six channels corresponding to the six filter elements is automatically calibrated before each grain sample is analyzed.

What has been described is a detailed circuit arrangement of a grain analyst computer which has automatic compensation means for setting the circuitry to a fixed reference standard before each grain sample is analyzed. The circuit arrangement also utilizes paired log amplifiers to provide plus and minus voltages which are applied to variable resistance networks used to set the constants of the circuit. In addition, the photocell used is in alignment with the light source and lens and only reflected light signals from the grain sample are used. While the grain analyst computer of this invention has particular utility when used for analyzing grain samples such as soybeans or the like, it will be understood that other substances can be analyzed in a similar manner. All that be required is that a suitable reference standard element be substituted so that the constants within the resistor networks of the circuit can be adjusted accordingly. Therefore, many variations and modifications of this invention may be effected without departing from the spirit and scope of the novel concepts disclosed and claimed herein.

The invention is claimed as follows:

1. A grain analyst computer comprising in combination: a light source for directing light energy toward the surface of a grain sample to be analyzed, filter means positioned between said light source and the grain sample so that only a specific light spectrum of said light source will pass through said filter means and impinge upon the grain sample, said specific light spectrum corresponding to a specific constituent of the grain sample being analyzed, sensing means responsive to the reflected specific light spectrum from said grain sample to thereby produce electrical signals corresponding to the quantity of a given constituent being measured within the grain sample, signal storage means for receiving the electrical signals from said sensing means, computing circuit means connected to said signal storage means for computing said electrical signals into direct reading signals corresponding to the constituents being measured, readout means connected to said computing circuit means for producing visual readout display in per cent of the constituents being measured within the grain sample, and reference standard means to be positioned in alignment with said light source and said filter means so as to provide a reflected signal of known constituent properties corresponding to the constituents within the grain sample to be analyzed, and means actuated by the positioning of said reference standard in alignment with said light source to energize circuitry for automatically calibrating said computing circuit means to provide accurate readings for each of the grain samples being analyzed.

2. The grain analyst computer of claim 1 wherein said grain sample is placed at a predetermined point with respect to said light source, and said reference standard is automatically positioned at said predetermined point when said grain sample is displaced therefrom, said switch means automatically actuating a compensating circuit responsive to signals received from said reference standard for adjusting said signal storage means and said computing circuit means to provide an accurate measurement of the constituents within said grain sample.

3. The grain analyst computer of claim 1 wherein said sensing means is positioned between and in direct alignment with said filter means and the grain sample.

4. The grain analyst computer of claim 1 wherein said signal storage means includes means for producing a pulse signal having an amplitude corresponding to the quantity of the constituent being measured, and means for converting the amplitude pulse signal to a DC voltage, and means for comparing the difference between the amplitude pulse signal and the DC voltage, said last means including circuit means for producing an output voltage proportional to the logarithm of its input.

5. The grain analyst computer of claim 4 further including first and second operational amplifiers responsive to the log voltage output of said circuit means for producing plus and minus log voltage signals of the same amplitude as said log voltage output.

6. A grain analyst computer comprising: means for producing a plurality of pulse signals having amplitudes corresponding to the quantity of a characteristic of the constituents being measured, coupling capacitor means for receiving said pulse signals, said coupling capacitor means having inherent DC losses of said pulse signals, first and second amplifier circuit means, said first amplifier circuit means being direct current coupled to said coupling capacitor, said second amplifier circuit means being switchably connected to said coupling capacitor and including storage capacitor means for receiving said pulse signals to provide a stored DC voltage level, a difference amplifier having first and second inputs connected to said first and second amplifier circuit means, said difference amplifier providing an output signal corresponding to the difference of the signals from said first and second amplifier circuit means, said difference signal having a DC level compensating for the DC losses of said coupling capacitor, circuit means for converting said DC level to a logarithm voltage, third and fourth amplifier circuit means for receiving said logarithm voltage to produce corresponding plus log and minus log voltage signals, summation circuit means for receiving the plus log and minus log voltage signals to produce a composite voltage signal corresponding to a particular constituent being measured, and readout means for translating said composite voltage signal into a direct readout of the per cent of the constituent being measured.

7. The grain analyst computer of claim 6 wherein said first, second, third and fourth amplifier circuit means and said difference amplifier are operational amplifiers.

8. The grain analyst computer of claim 6 wherein there is at least two pulse signals for each constituent measured.

9. The grain analyst computer of claim 6 wherein said means for producing a plurality of pulse signals includes a light source for directing light energy toward the surface of a grain sample to be analyzed, filter means positioned between said light source and the grain sample so that only a specific light spectrum of the light source will pass through said filter means at a given time and impinge upon the grain sample, said specific light spectrum corresponding to a specific constituent of the grain sample being analyzed, and sensing means responsive to the reflected specific light spectrum from said grain sample to thereby produce said pulse signals.

10. The grain analyst computer of claim 9 wherein a grain sample is placed at a predetermined point with respect to said light source, and a reference standard means is positioned in alignment with said light source and said filter means so as to provide a reflected signal of known constituent properties corresponding to the contituents within the grain sample to be analyzed, said reference standard means automatically calibrating said summation circuit means prior to measuring each grain sample.

11. The grain analyst computer of claim 9 wherein said light source is a source of infrared radiation.

* * * * *